Patented Feb. 17, 1931

1,792,657

UNITED STATES PATENT OFFICE

RICHARD PASTERNACK, OF BROOKLYN, AND FRANKLIN G. BREHMER, OF FOREST HILLS, NEW YORK, ASSIGNORS TO CHARLES PFIZER & COMPANY, OF BROOKLYN, NEW YORK, A CORPORATION OF NEW YORK

GRANULAR ANHYDROUS CITRIC ACID AND PROCESS OF MAKING SAME

No Drawing.    Application filed September 26, 1929.    Serial No. 395,462.

The object of this invention is the preparation of an improved form of substantially anhydrous citric acid which lends itself particularly well to the manufacture of compressed tablets consisting solely of citric acid or containing it as an ingredient, or for mixing with granular effervescent salts.

A product suitable for the purpose mentioned must be of such a structure that it will answer the following requirements:—The size of the particles should be similar to that of coarse sand, fairly uniform and free of powder; the product should be free-flowing, thus insuring tablets of uniform weight; furthermore, the product must have a certain fine crystalline structure, so that the compressed tablet holds its form, does not adhere to the die, and is ejected readily from the machine.

Heretofore, it has not been possible to make in an economical manner a product fulfilling all these requirements.

Granulated anhydrous (or dehydrated) citric acid can be made by fusing hydrated citric acid (the ordinary commercial citric acid crystallizes with 1 molecule of water), at about 135° C. until all water has been driven off, letting the fused mass solidify by cooling, then grinding it and finally separating the particles of proper size by screening. This operation is wasteful, since it is not possible to fuse the acid a second time without serious decomposition.

Another method is to crystallize anhydrous citric acid from a concentrated soltuion above 60° C. In this case it is very difficult to obtain a suitable crystalline structure, aside from difficulties encountered in the separation of the mother liquors.

It was found now that an anhydrous citric acid eminently suitable for tablet manufacture can be made in the following manner:—

Hydrated citric acid of the desired granulation is selected. For making compressed tablets, we prefer to use comminuted hydrated citric acid which passes through a 20 mesh screen, but which is retained on a 40 mesh screen, as this produces granules of about the same size and with substantially no, or very little, powder. Hydrous citric acid powder, or very fine crystals of hydrous citric acid, does not flow freely, as is required in tablet machines or in granular effervescent powders, and in a tablet machine does not compress into a tablet and does adhere to the dies. If it is sought to compress comminuted hydrated citric acid into tablets, the heat of compression is likely to cause the crystals to melt or partially fuse, which precludes producing a satisfactory tablet. The screened hydrated citric acid or unscreened hydrated citric acid is then heated in shallow layers of about an inch thick with or without vacuum in a current of dry air until practically completely dehydrated. We have found 99% dehydration satisfactory for free flowing in a tablet machine, but do not restrict ourselves to such degree of dehydration. The dehydration process is controlled by the temperature of the air current. The temperature can be varied between 35 and 50° C. Dehydration of citric acid begins at about 28° C. However, dehydration at such a low temperature results in disintegration of the particles, so that mostly powder is obtained. Dehydration above 50° causes softening and partial fusion. This retards the drying operation and produces a harder dehydrated acid, which is not desirable for the purpose mentioned. We prefer an initial temperature of about 35° C. and a final temperature of about 45° C. The operator controls the temperature according to the appearance of the product. The product obtained by carrying out the dehydration at a temperature between 35 and 50° C. as described consists of opaque granules, each granule being an agglomeration of microscopically small crystals of anhydrous citric acid. Free flowing granular commercial product made according to this invention from hydrated citric acid retained substantially the same screen characteristics as the hydrated material. This is of great importance as thereby the coarseness of the finished material can be predicted from the coarseness of the starting material, and thus a final material obtained best suited for making tablets, and for granular effervescent salts, or other purposes.

The invention claimed is:

1. Process of dehydrating citric acid consisting in drying at a temperature of between 35° C. and 50° C.

2. Process of dehydrating citric acid consisting in drying at a temperature ranging between 35° C. and 45° C.

3. Process of converting nonfree flowing hydrated comminuted citric acid to free flowing granular anhydrous citric acid consisting in disposing the acid to be treated in shallow layers and applying dry heated air at a temperature of between 35° C. and 50° C. until the acid becomes granular and free flowing.

4. As a new product of manufacture, granular substantially anhydrous citric acid consisting of uniform opaque granules, each granule being an agglomeration of microscopically small crystals of anhydrous citric acid.

5. As a new product, free flowing granular substantially anhydrous citric acid.

6. As a new article of manufacture, a stable tablet compressed from free flowing granular anhydrous citric acid.

Signed at Brooklyn, in the county of Kings, and State of New York, this 25th day of September, A. D. 1929.

RICHARD PASTERNACK.
FRANKLIN G. BREHMER.

The invention claimed is:
1. Process of dehydrating citric acid consisting in drying at a temperature of between 35° C. and 50° C.
2. Process of dehydrating citric acid consisting in drying at a temperature ranging between 35° C. and 45° C.
3. Process of converting nonfree flowing hydrated comminuted citric acid to free flowing granular anhydrous citric acid consisting in disposing the acid to be treated in shallow layers and applying dry heated air at a temperature of between 35° C. and 50° C. until the acid becomes granular and free flowing.
4. As a new product of manufacture, granular substantially anhydrous citric acid consisting of uniform opaque granules, each granule being an agglomeration of microscopically small crystals of anhydrous citric acid.
5. As a new product, free flowing granular substantially anhydrous citric acid.
6. As a new article of manufacture, a stable tablet compressed from free flowing granular anhydrous citric acid.

Signed at Brooklyn, in the county of Kings, and State of New York, this 25th day of September, A. D. 1929.

RICHARD PASTERNACK.
FRANKLIN G. BREHMER.

CERTIFICATE OF CORRECTION.

Patent No. 1,792,657.   Granted February 17, 1931, to

RICHARD PASTERNACK ET AL.

It is hereby certified that the State of Incorporation in the above numbered patent was erroneously given as "New York", whereas said State should have been given as New Jersey, as shown by the records of assignments in this office; and that the said Letters Patent should be read with this correction therein that the same may conform to the record of the case in the Patent Office.

Signed and sealed this 7th day of April, A. D. 1931.

M. J. Moore,
Acting Commissioner of Patents.

(Seal)

CERTIFICATE OF CORRECTION.

Patent No. 1,792,657.  Granted February 17, 1931, to

RICHARD PASTERNACK ET AL.

It is hereby certified that the State of Incorporation in the above numbered patent was erroneously given as "New York", whereas said State should have been given as New Jersey, as shown by the records of assignments in this office; and that the said Letters Patent should be read with this correction therein that the same may conform to the record of the case in the Patent Office.

Signed and sealed this 7th day of April, A. D. 1931.

(Seal)

M. J. Moore,
Acting Commissioner of Patents.